United States Patent [19]

Euler et al.

[11] 4,298,417
[45] Nov. 3, 1981

[54] METHOD OF MANUFACTURING A HELICOPTER ROTOR BLADE

[75] Inventors: August H. L. Euler, Aix-en-Provence; Gilbert F. A. Beziac, Salon de Provence, both of France

[73] Assignee: Societe Nationale Industrielle Aerospatiale, France

[21] Appl. No.: 119,912

[22] Filed: Feb. 8, 1980

Related U.S. Application Data

[62] Division of Ser. No. 879,915, Feb. 22, 1978, Pat. No. 4,213,739.

[30] Foreign Application Priority Data

Feb. 28, 1977 [FR] France .............................. 77 05767

[51] Int. Cl.³ ................................................ B32B 1/10
[52] U.S. Cl. ................................... 156/228; 156/245; 156/307.3; 156/307.7; 29/156.8 P
[58] Field of Search ................... 29/156.8 B, 156.8 P; 416/230 A, 230 R, 226; 156/307.3, 307.7, 245, 228

[56] References Cited

U.S. PATENT DOCUMENTS

| | | | |
|---|---|---|---|
| 2,202,014 | 5/1940 | Lougheed | 416/230 |
| 2,362,301 | 11/1944 | Pecker | 416/226 |
| 2,621,140 | 12/1952 | Bitterli et al. | 156/245 |
| 2,630,868 | 3/1953 | Ellenberger | 416/230 A |
| 2,827,967 | 3/1958 | Schliekelmann | 416/230 A |
| 2,866,616 | 12/1958 | Stalker | 416/226 |
| 3,021,246 | 2/1962 | Hütter et al. | 416/230 A |
| 3,028,292 | 4/1962 | Hinds | 244/123 |
| 3,219,123 | 11/1965 | Stöcker | 416/230 A |
| 3,237,697 | 3/1966 | Ford et al. | 416/226 |
| 3,321,019 | 5/1967 | Dmitroff et al. | 416/229 |
| 3,528,753 | 9/1970 | Dutton et al. | 416/226 |
| 3,713,753 | 1/1973 | Brunsch | 416/226 |
| 3,754,840 | 8/1973 | Zincone | 416/226 |
| 3,782,856 | 1/1974 | Salkind et al. | 416/226 |
| 3,950,115 | 4/1976 | Euler | 416/226 |
| 3,962,506 | 6/1976 | Dunahoo | 416/230 |
| 3,967,996 | 7/1976 | Kamov et al. | 416/230 A |
| 4,083,656 | 4/1978 | Braswell et al. | 416/241 A |
| 4,095,322 | 6/1978 | Scarpati et al. | 29/156.8 P |
| 4,096,012 | 6/1978 | Belko et al. | 416/226 |
| 4,120,610 | 10/1978 | Braswell et al. | 416/226 |

OTHER PUBLICATIONS

"Boeing Emphasizes Glass Fiber Rotors", from *Aviation Week and Space Technology*, Mar. 20, 1978, vol. 108, No. 12, McGraw-Hill, Inc., p. 57.

*Primary Examiner*—Daniel C. Crane

[57] ABSTRACT

A rotor blade, specially for a helicopter rotor, which blade is made of reinforced plastics and a process for making this blade in a single molding operation.

This blade comprises: a solid one-piece leading edge spar embodied by strands of glass fibre filaments extending lengthwise over the whole length of the blade; a core made of a lightweight cellular substance and placed contiguous with the spar rear face; a thick sheet-like member extending around the spar and the core and comprising at least one layer of a fabric consisting of parallel glass fibres disposed askew of the blade longitudinal axis so as to form a torque-tube; a rear filling element, and a covering extending around the torque-tube and the rear filling element. The airfoil portion of this blade is centered substantially in the front quarter of the chord of the blade cross-section and it has a very high torsional stiffness.

1 Claim, 4 Drawing Figures

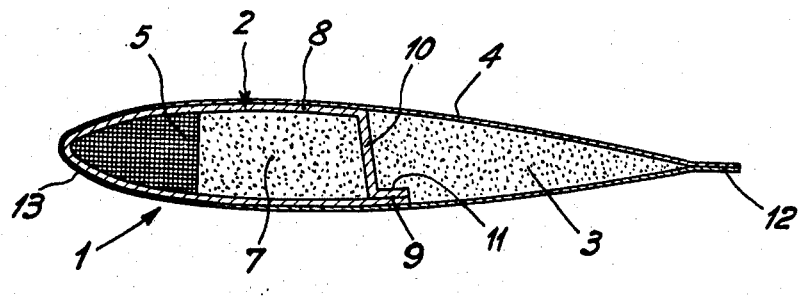
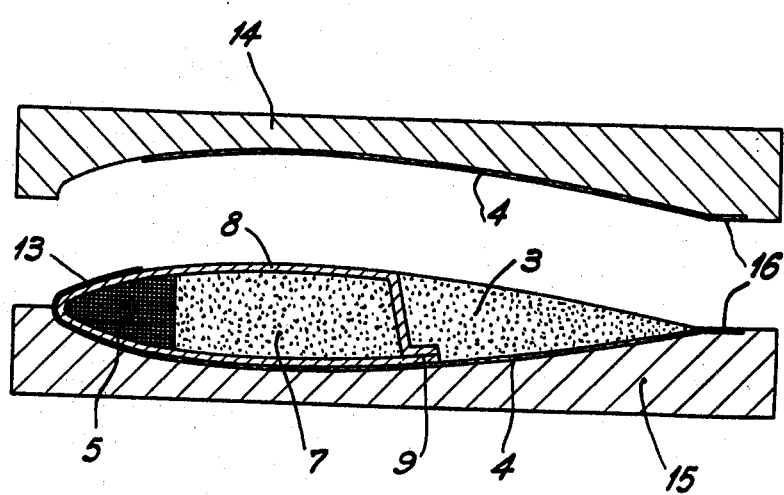

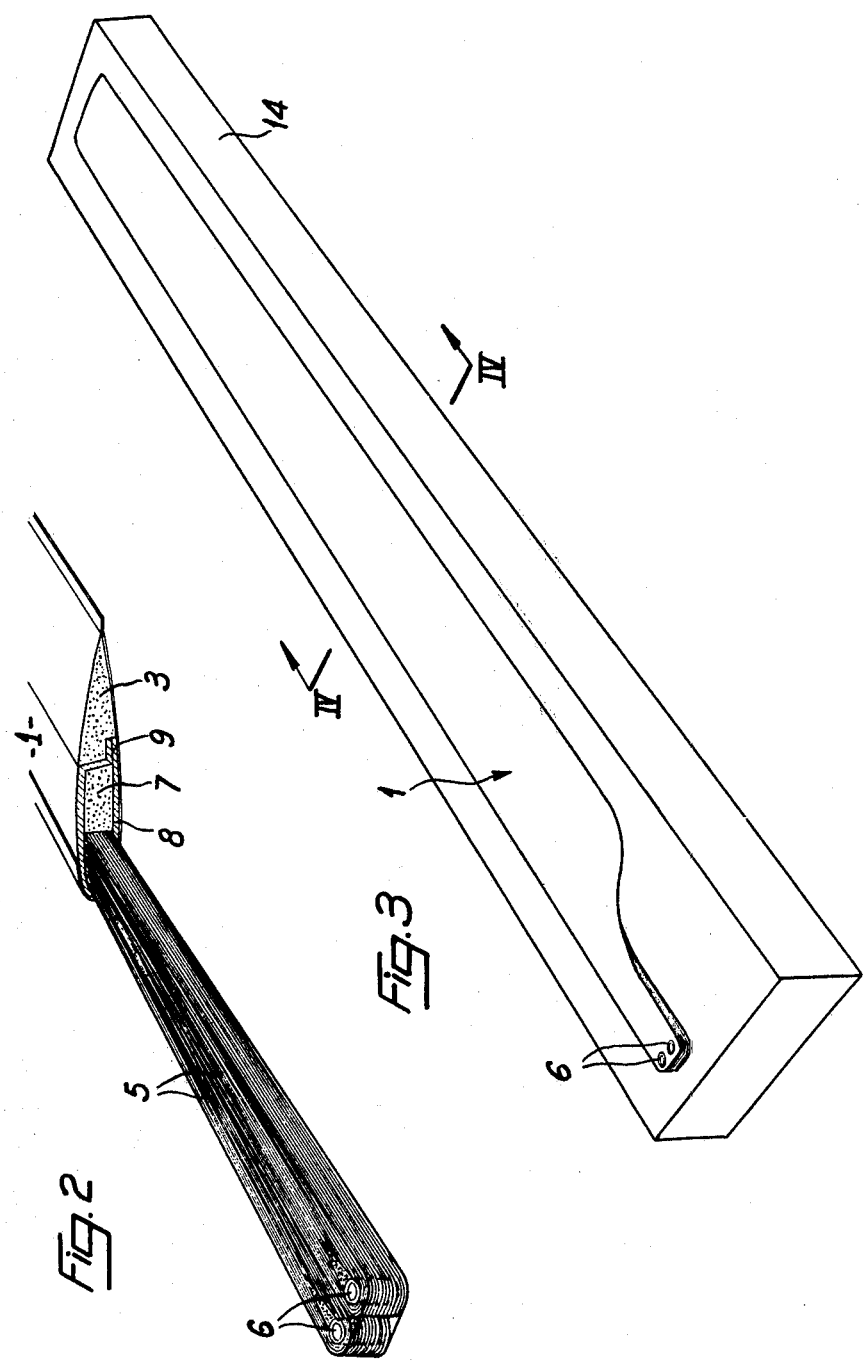

METHOD OF MANUFACTURING A HELICOPTER ROTOR BLADE

This case is a divisional application of the application Ser. No. 879,915 of the present inventors filed Feb. 22, 1978, issued as U.S. Pat. No. 4,213,739, granted July 22, 1980, and entitled "Helicopter Rotor Blade".

BACKGROUND OF THE INVENTION

1. Field of the Invention

This invention relates to a rotor blade, specially for a helicopter rotor, this blade being made of plastics strengthened by high-strength synthetic fibres, and to a process for making this blade in a single moulding operation.

2. Description of the Prior Art

Many different kinds of rotor blade, specially for helicopter rotors, are known which are made of plastics strengthened by high-strength synthetic fibres. In the conventional construction the airfoil part of the blade comprises a spar, which is prepared by the separate moulding of layers of filaments impregnated with thermosetting resin, and a rear member formed by a filler of a lightweight cellular material. Consecutive steps in manufacturing the blade comprise covering the above mentioned members with an envelope or covering made of a fabric of fibres pre-impregnated with a polymerizable synthetic resin, then possibly adding a leading-edge cap or the like made of metal or of a resilient substance, such as polyurethane, and a trailing-edge member, and finally assembling all these members by sticking and hot polymerisation.

French Pat. No. 1,255,075 to Société Grenobloise d'Etudes et d'Applications Hydrauliques (SOGREAH), issued on Jan. 23, 1961, discloses means to increase the rigidity and strength of reinforced plastics blades of this kind and to reduce their weight. This blade mainly comprises a solid central spar as a strengthening framework and one or more shaped members which are stuck to the spar. The spar core is first prepared by polymerizing together cores which are made of an expanded material and which are separated by glass fabric partitions. Rovings of fibres are then disposed lengthwise in two layers one above another and anchored to a connecting flange to form the sill of the spar, whereafter the system comprising the core and the sill, strengthened by a lateral binding with laminated fabrics, is polymerized; finally, the blade covering or envelope is made by sticking transverse pieces of plastics fabric to the spar after it has been provided with appropriate ribs and strengthenings.

U.S. Pat. No. 3,237,697 to Ford and Tarczinski, issued on Mar. 1, 1966, also discloses a plastics blade comprising a core, a spar assembly and a leading-edge assembly, which is prepared beforehand, and then assembled together with the blade covering, consisting of sheets or the like of reinforced plastics. The spar assembly, which is also moulded separately, consists of an inner support which is made of a lightweight cellular substance which is covered by two rows of plastics sheets, with reinforcement by filaments which extend lengthwise in the direction of blade span. The spar assembly is then placed for polymerization in the mould in which the leading-edge assembly and the blade covering were first moulded. In a final phase the system placed in the mould is joined to the blade core of cellular material and to edging members.

U.S. Pat. No. 3,321,019 to Dmitroff and Fox, issued on May 23, 1967, also discloses the manufacturing of a glass fibre reinforced plastics blade. The blade root part consists of a stack of metal plates alternating with glass fibre cloth sheets. The blade transition part comprises a flat core prepared beforehand with a plastics reinforced by a glass fibre roving. The flat core extends with a different shape in the airfoil part of the blade and is disposed along the leading edge and intimately follows the shaped part thereof, this core being the strengthening member of the blade. The rear part of the blade is formed with cavities bounded by glass fibre cloth partitions extending from one surface to the other; these partitions are formed by means of formers during preparation of the blade in metal moulds. When vacuum-injected into the moulds the plastics impregnates the glass fibre cloths.

Most of these known blades are therefore manufactured in a number of steps or phases: any mention of a single moulding operation in the above mentioned patents does actually refer to the final moulding of components previously produced by being moulded separately, sometimes by means of formers. The kind of spar used in these known blades to increase blade strength actually exists only in the small proportion of the span between the connecting member and the airfoil part of the blade, where the cross-section of the spar changes form a D-shape to a C-shape.

It must be also appreciated that the stiffness characteristics of a rotor blade in its plane and in a plane perpendicular thereto are to be so determined that the beat and drag frequencies of the rotating blade differ from the frequency corresponding to the angular velocity of the rotor and from the harmonics of such frequency.

Many experiences with blades of this kind fitted to rotors which may or may not have beat and/or drag articulations have further convinced the Applicants that to reduce vibrations it is very advantageous to suppress any coupling between the beat or drag movements of the blade and blade twisting and therefore to give the blade a very high torsional stiffness.

U.S. Pat. No. 3,782,856 to Salkind and Reinfelder, issued on Jan. 1, 1974, discloses means for increasing the torsional stiffness of a helicopter blade. The blade thus disclosed consists of two strengthening beams each embodied by a central honeycomb core; stuck to the outside surface thereof is a spar in the shape of a flattened U, such spar extending longitudinally and consisting of high-strength fibres, e.g. of graphite or boron, or by composite fibre systems comprising metal fibres. Each beam also has on either side of the central core leading-edge counterweights, a front filler and a rear filler. The two joined-together beams are enveloped or encased in a skin consisting of alternate layers, one-third of which are formed by sheets of glass fibres parallel to the blade longitudinal axis while two-thirds are formed by sheets of graphite fibres disposed at angles of $+45°$ or $-45°$ to the latter axis. The whole forms a "torque-tube" to the rear of which unitary separate pockets stuffed with a lightweight material are stuck. However, the manufacture of this blade comprises the following discrete steps:

1. Preparing the first half of the torque-tube, comprising placing the skin and spar materials in a mould and polymerizing them, then inserting the central core, the counterweights and the fillers and sticking them, then machining the outside surface of this first half of the torque-tube;

2. preparing the second half of the torque-tube by the same sequence of operations, and 3. assembling the two tube halves together after any necessary weight corrections, and finally sticking the pockets to the rear part of the tube-torque.

This blade has the disadvantage of being expensive to manufacture since fibres having a high elasticity modulus such as graphite and/or boron fibres are much dearer than ordinary fibres such as glass fibres—ten times dearer in the case of graphite and forty times dearer in the case of boron. Also, these very high elasticity modulus fibres call for a manufacture which is not only more difficult but also costlier, since fabrics produced with such fibres are difficult to coat and to stick, because they have incompatibility with some resins, and their stiffness makes it difficult to position them.

U.S. Pat. No. 3,950,115 to Euler, issued on Apr. 13, 1976, discloses a high strength rotor blade comprising longitudinal rovings forming a loop at the blade root; the rovings are assembled by a compact filling wih a lateral extension of a metal mountng member, comprising a socket which is surrounded by said roving loop and through which a metal pin may be engaged to secure the blade to the rotor hub. In spite of one of said rovings being placed at the leading edge of the blade, the latter comprises no means to increase its torsional stiffness.

French Patent Application Ser. No. 76.08109 (2,304,512) to Textron Inc., published on Oct. 15, 1976, discloses a composite rotor blade, comprising a substantially C-shaped two-part leading edge member consisting of plastics strengthened by longitudinal fibres, an inner tubular sleeve consisting of plastics strengthened by fibres arranged in layers crossing each other, said inner sleeve being engaged into the rear open channel of said C-shaped leading edge member, an outer tube consisting of plastics strengthened by fibres arranged in layers, crossing each other, said outer tube surrounding said leading edge member and said inner sleeve, a rear member, and a covering jointing together said outer tube and said rear member. With this blade construction, a "torque-tube" is formed only by the inner sleeve; nevertheless, as this "torque-tube" is hollow, and not substantially thicker than the outer tube, whereas its cross-section has a much less area than the cross section of said outer tube, said "torque-tube" only slightly increases the torsional stiffness of this blade. Moreover, its mechanical strength is reduced and its manufacturing is made uneasy because the C-shaped leading edge member has a rear open channel, into which the inner sleeve is to be engaged, so that said C-shaped leading edge member is necessarily a two-part member.

SUMMARY OF THE INVENTION

A first object of this invention is to manufacture a rotor blade, which is free from all the disadvantages mentioned above is made of reinforced plastics and has a very high torsional stiffness.

A second object of this invention is to design a rotor blade which can be produced in a single mould in which all the components of the blade are assembled, then submitted to a single operation for polymerizing the substances impregnating said components, so as to provide a simple, lightweight and low-cost rotor blade.

A further object of this invention is to provide for a rotor blade, specially for a helicopter, comprising a substantially D-shaped solid one-part leading edge spar embodied by strands of glass fibre filaments which extend lengthwise over the whole length of the blade; a solid core made of a lightweight cellular substance and juxtaposed to the whole rear face of said D-shaped spar; a sheet-like member extending around said spar and said core and comprising at least one layer of a fabric formed by parallel glass fibres disposed askew of the blade longitudinal axis; a rear filling member, and a covering extending around said sheet-like member and said rear filling member, said sheet-like member being very thick, and specially much thicker than said covering, so as to form a torque-tube, encasing said juxtaposed spar and core, so that the airfoil portion of the blade is centered substantially at the front quarter of the chord of the blade cross-section, and has a very high torsional stiffness.

Consequently, the rotor blade according to this invention has a "torque-tube" which is formed by the assembly comprising the spar, the core and the sheet-like member extending around said spar and core. As this "torque-tube" is not hollow, but solid, and is substantially thicker than the blade covering, whereas its cross-section has a large area, said "torque-tube" strongly increases the torsional stiffness of the blade. The same results from said spar being a substantially D-shaped one-part member, which also makes it easier to manufacture the blade according to this invention in a single mould, by a single polymerization operation.

Moreover it is very advantageous that the blade according to this invention has an airfoil portion substantially centered at the front quarter point of the chord of the blade cross-section because this point substantially coincides with the centre of the aerodynamic forces acting on the blade airfoil and with the trace of the blade articulation axis in incidence, whereby the blade control forces are reduced.

In a preferred embodiment of the blade according to this invention, the D-shaped spar, the solid core and the sheet like member form a strengthening frame-work extending along the chord of the blade cross-section over about the front half thereof so as to form substantially the whole front half part of the blade.

This invention greatly facilitates mass production of plastics blades and is also an aid to ready and low-cost production of blades whose chord, thickness and twist angle vary along the blade, even when they vary considerably as is the case e.g. for blades of convertible helicopters and for screws.

BRIEF DESCRIPTION OF THE DRAWINGS

A blade according to the present invention will now be described by way of example and it is shown diagrammatically in the figures of the accompanying drawings in which:

FIG. 1 is a cross-sectional view of the blade;

FIG. 2 is a part sectional view in oblique perspective of the root part of the blade of FIG. 1;

FIG. 3 is a view in oblique perspective of the blade of FIGS. 1 and 2 after it has been moulded and the top partial mould has been removed, and FIG. 4 is a cross sectional view through line IV—IV of FIG. 3 in which the top partial mould can also be seen lifted above the bottom partial mould.

DESCRIPTION OF THE PREFERRED EMBODIMENT

In FIG. 1 the blade comprises a composite strengthening framework 2 extending along the length of the chord of the cross-section substantially over the front half of the blade cross-section so as intimately to follow the blade outside shape. A rear element 3 also intimately follows the blade shape. A covering or the like 4 completely envelopes or encases the framework 2 and element 3.

Basically, the framework 2 comprises a leading-edge spar 5 which extends at the front of the framework 2 over approximately from 15 to 20% of the cross-sectional chord and which in cross-section substantially has the shape of a slightly flattened D. The leading edge spar 5 is unitary and is constructed from strands or skeins of layered filaments of glass fibres which have been pre-impregnated but not polymerized and which extend longitudinally from the tip to the root of the blade; in the root zone the layers extend around socket-like members 6 which can be seen in FIG. 2 and which are adapted to form the connection of the blade to the rotor hub (not shown). The skeins or the like then extend back from the socket-like members 6 to the blade tip.

The rear part of the framework 2 comprises a lightweight cellular core 7 which is placed up against the spar 5 in the direction of the cross-sectional chord towards the rear of the blade cross-section.

The system formed by the spar 5 and core 7 is completely enveloped or encased in a continuous sheet or the like 8 embodied by at least one very thick layer of parallel glass fibres arranged askew to the blade longitudinal axis at an angle of approximately 45° thereto. The sheet 8 therefore forms a tube which is torsionally very stiff that is to say a torque-tube having the highest possible torsional stiffness with respect to the required dimensions and to the requirement that this torque-tube must be of reduced weight. The transverse edges of the sheet 8 are joined together at the back—i.e. towards the blade trailing edge—to form an overlapping part 9 adapted to receive shear forces in this zone of the blade.

The arrangement of the elements forming the composite framework, more particularly the spar 5, at the front of the blade cross-section helps to centre the main or airfoil part of the blade properly towards the front quarter of the chord of blade cross-section without any call for counterweights or loading elements.

The blade comprises for the rest a rear filling element 3, in the form of a lightweight cellular substance cut very accurately to match the shape of blade cross-section. The rear filling element 3, which engages completely with the rear surface 10 of the torque-tube 8, is formed in its bottom front part with a recess 11 which is filled very accurately by the overlapping part 9.

The framework 2 and element 3 are enveloped or encased completely by the covering 4, which is embodied by pre-impregnated glass fibre fabrics the edges of which are jointed in a horizontal plane at the back of the blade so as to form a trailing-edge 12. The covering 4, which comprises a lower-surface skin and an upper-surface skin, terminates in the leading-edge zone to allow for the installation of a cap or the like 13 which serves to protect the blade against attack by external agents, such as rain or hail or sand or the like. The cap 13 can be made of a metal, such as stainless steel or titanium, or of a resilient substance, e.g. a polyurethane.

A description will now be given, with reference to FIGS. 3 and 4, of the process for producing the blade of the invention as hereinbefore described. The blade is prepared in a metal mould consisting of two rigid partial moulds—a top partial mould 14 and a bottom partial mould 15. The internal shape of each partial mould has the shape of the corresponding half of the blade cross-section, the shape, thickness chord and twist angle of the blade varying as required along the length of the blade. Each partial mould 14, 15 is also formed in the junction or boundary plane with a small recess 16 serving to form the trailing edge 12 of the blade (FIG. 1).

The following items are then placed seriatim in the bottom partial mould 15:

the lower-surface skin of the covering 4, so that its edge corresponding to the subsequent trailing edge is received in the recess 16 while its opposite edge clears the leading-edge zone;

the lower-surface part of the continuous sheet 8 of fabrics or the like which will subsequently form the torque-tube 8, the upper-surface part of it being left unfolded outside the bottom partial mould 15;

the skeins or strands of pre-impregnated unpolymerized layers of filaments which will subsequently form the spar 5 and which are passed around the socket members 6 at the blade root;

the core 7 on which the upper-surface part of the sheet 8 is folded to form the overlapping part 9;

the stainless steel cap or the like 13 which will subsequently form the leading edge, after it has been given internal roughening and treated with a film of adhesive to boost sticking, and the rear filling element 3.

The top partial mould 14, in which the upper-surface skin of the covering 4 has been placed, is then positioned on and locked to the bottom partial mould 15.

The complete mould is then placed in an oven at a temperature of 120° C. to polymerize the substances impregnating the various elements which make up the blade.

The cap 13, instead of being made of stainless, can be made of a resilient substance such as polyurethane, in which case the cap 13 is stuck to the leading edge of the blade after polymerization by means of a flexible adhesive.

The blade according to this invention and having a stiff torque-tube can therefore be produced in a single mould and in a single step, the amount of resin used to pre-impregnate each blade element being chosen so as to ensure that there is no burring. The constituent elements of the blade are so devised as to require no weight corrections, a feature which makes for good blade balancing and interchangeability.

This invention is not limited to the embodiment described and covers all the variants thereof.

What we claim is:

1. A process for manufacturing a rotor blade, especially for a helicopter, said process comprising the successive steps of impregnating certain components of the blade with polymerizable substances, placing said impregnated components in a single mould comprising two rigid partial moulds, one of which is a bottom partial mould and the other a top partial mould, the internal shape of each partial mould being adapted to the shape of the corresponding part of the blade with respect to variations of blade shape, thickness, chord and twist angle along a blade length, assembling said two partial moulds, and finally submitting the assembled mould to a thermal process for polymerizing the substances impregnating said blade components in the mould, and including the steps of (a) placing seriatim in said bottom partial mould;
a lower-face part of a blade covering comprising also an upper-face part, a lower-face part of a thick sheet of fabrics comprising also an upper-face part, and intended to subsequently form a torque-tube, said upper-face part being left unfolded outside of said bottom partial mould;

a substantially D-shaped bundle of strands of glass fibre filament having a rounded front face and a flat rear face and which is placed in the front part of said bottom partial mould and is intended to subsequently form a leading edge spar;

a core of a lightweight cellular substance, juxtaposed to the whole rear face of said D-shaped strand bundle;

(b) folding said upper-face part of said sheet of fabrics above said juxtaposed spar and core so as to wrap them up and preform a torque-tube;

(c) placing a cap on the front part of said preformed torque-tube intended to subsequently form the leading edge of the blade;

(d) placing a rear filling member in said bottom partial mould in juxtaposition to said folded sheet of fabrics;

(e) placing said upper-face part of said blade covering in said top partial mould;

(f) locking said top partial mould to said bottom partial mould; and (g) placing the mould thus filled in an oven of about 120° C. to polymerize the impregnating substances of the blade components.

* * * * *